US007221917B2

(12) United States Patent
Kroeger

(10) Patent No.: US 7,221,917 B2
(45) Date of Patent: May 22, 2007

(54) ADJACENT CHANNEL INTERFERENCE MITIGATION FOR FM DIGITAL AUDIO BROADCASTING RECEIVERS

(75) Inventor: Brian William Kroeger, Sykesville, MD (US)

(73) Assignee: IBiquity Digital Corporation, Columbia, MD (US)

(*) Notice: Subject to any disclaimer, the term of this patent is extended or adjusted under 35 U.S.C. 154(b) by 737 days.

(21) Appl. No.: 10/136,136

(22) Filed: May 1, 2002

(65) Prior Publication Data

US 2003/0207669 A1 Nov. 6, 2003

(51) Int. Cl.
*H04B 1/16* (2006.01)

(52) U.S. Cl. .............................. 455/192.2; 455/182.2; 455/258

(58) Field of Classification Search ............ 455/192.2, 455/182.2, 258, 324; 375/344, 97, 324
See application file for complete search history.

(56) References Cited

U.S. PATENT DOCUMENTS 4,907,293 A 3/1990 Ueno
5,220,687 A 6/1993 Ichikawa et al.
5,241,697 A 8/1993 Hansen
5,278,826 A 1/1994 Murphy et al.
5,278,844 A 1/1994 Murphy et al.
5,315,583 A 5/1994 Murphy et al.
5,339,455 A 8/1994 Vogt et al.
5,416,422 A 5/1995 Dildine
5,465,396 A 11/1995 Hunsinger et al.
5,465,410 A 11/1995 Hiben et al.
5,487,186 A * 1/1996 Scarpa .................... 455/192.2
5,493,717 A 2/1996 Schwarz
5,548,839 A 8/1996 Caldwell et al.
5,564,093 A 10/1996 Matsumoto
5,867,535 A 2/1999 Phillips et al.
5,949,796 A 9/1999 Kumar
5,949,832 A 9/1999 Liebetreu et al.
6,047,171 A 4/2000 Khayrallah et al.
6,058,148 A 5/2000 Whikehart et al.
6,108,810 A 8/2000 Kroeger et al.
6,137,843 A 10/2000 Chennakeshu et al.
6,154,547 A 11/2000 Whitecar
6,178,211 B1 1/2001 Whikehart et al.
6,178,314 B1 1/2001 Whikehart et al.
6,178,317 B1 1/2001 Kroeger et al.
6,246,698 B1 6/2001 Kumar
(Continued)

*Primary Examiner*—Joseph Feild
*Assistant Examiner*—Phuoc Doan
(74) *Attorney, Agent, or Firm*—Robert P. Lenart, Esq.; Pietragallo Bosick & Gordon, LLP

(57) ABSTRACT

A method of receiving an FM digital audio broadcasting signal including a first plurality of subcarriers in an upper sideband of a radio channel and a second plurality of subcarriers in a lower sideband of the radio channel comprises the steps of mixing the digital audio broadcasting signal with a local oscillator signal to produce an intermediate frequency signal, passing the intermediate frequency signal through a bandpass filter to produce a filtered signal, determining if one of the upper and lower sidebands of the digital audio broadcasting signal is corrupted, and adjusting the local frequency oscillator signal to change the frequency of the intermediate frequency signal such that the bandpass filter removes the subcarriers in the upper or lower sideband that has been corrupted. A receiver that processes a digital audio broadcasting signal in accordance with the method is also provided.

19 Claims, 4 Drawing Sheets

U.S. PATENT DOCUMENTS

| | | | |
|---|---|---|---|
| 6,259,893 | B1 | 7/2001 | Kroeger et al. |
| 6,266,522 | B1 | 7/2001 | Holden et al. |
| 6,430,724 | B1 | 8/2002 | Laneman et al. |
| 6,577,688 | B1 | 6/2003 | Nease |
| 2001/0044288 | A1 | 11/2001 | Zumkeller et al. |
| 2001/0050926 | A1* | 12/2001 | Kumar ....................... 370/529 |

* cited by examiner

ADJACENT CHANNEL INTERFERENCE MITIGATION FOR FM DIGITAL AUDIO BROADCASTING RECEIVERS

BACKGROUND OF THE INVENTION

This invention relates to methods and apparatus for receiving a Digital Audio Broadcasting (DAB) signal, and more particularly, to such methods and apparatus that mitigate adjacent channel interference in the DAB signal.

Digital Audio Broadcasting is a medium for providing digital-quality audio, superior to existing analog broadcasting formats. Both AM and FM DAB signals can be transmitted in a hybrid format where the digitally modulated signal coexists with the currently broadcast analog AM or FM signal, or in an all-digital format without an analog signal. In-band-on-channel (IBOC) DAB systems require no new spectral allocations because each DAB signal is simultaneously transmitted within the spectral mask of an existing AM or FM channel allocation. IBOC systems promote economy of spectrum while enabling broadcasters to supply digital quality audio to their present base of listeners. Several IBOC DAB approaches have been suggested.

FM DAB systems have been the subject of several United States patents including U.S. Pat. Nos. 6,259,893; 6,178,317; 6,108,810; 5,949,796; 5,465,396; 5,315,583; 5,278,844 and 5,278,826. One FM IBOC DAB system uses a composite signal that includes orthogonal frequency division multiplexed (OFDM) subcarriers in the region from about 129 kHz to 199 kHz away from the FM center frequency, both above and below the spectrum occupied by an analog modulated host FM carrier. Some IBOC options (e.g., the All-Digital option) permit subcarriers starting as close as 100 kHz away from the center frequency.

The digital portion of the DAB signal is subject to interference, for example, by first-adjacent FM signals or by host signals in Hybrid IBOC DAB systems. The FM Digital Audio Broadcasting signal is designed to tolerate interference in a number of ways. Most significantly, the digital information is transmitted on both lower and upper sidebands. The digital sidebands extend out to nearly 200 kHz from the center carrier frequency. Therefore an intermediate frequency (IF) filter in a typical FM receiver must have a flat bandwidth of at least ±400 kHz. One proposed First Adjacent Canceller (FAC) technique requires an approximately flat response out to about ±275 kHz from the center for effective suppression of a first adjacent signal. This would normally require an IF filter with a flat bandwidth of at least 550 kHz. A first adjacent cancellation technique is disclosed in U.S. Pat. No. 6,259,893, which is hereby incorporated by reference.

DAB systems utilize a specially designed forward error correction (FEC) code that spreads the digital information over both the upper and lower sidebands. The digital information can be retrieved from either sideband. However, if both sidebands are received, the codes from both the upper and lower sidebands can be combined to provide an improved output signal.

FM stations are geographically placed such that the nominal received power of an undesired adjacent channel is at least 6 dB below the desired station's power at the edge of its protected contour or coverage area. Then the D/U (desired to undesired power ratio in dB) is at least 6 dB. There are exceptions to this rule, however, and listeners expect coverage beyond the protected contour increasing the probability of higher interference levels.

At a station's edge of coverage, a second adjacent's nominal power can be significantly greater (e.g. 40 dB) than the host's nominal power within the desired coverage area. This can present a problem for the IF portion of the receiver where dynamic range is limited. The IF is where the IBOC DAB signal is converted from analog to digital. The sample rate and number of effective bits in the analog-to-digital (A/D) converter limit the dynamic range of the IF section.

A B-bit A/D converter has a theoretical instantaneous dynamic range of about (1.76+6*B) dB (maximum sinewave to noise ratio in its Nyquist bandwidth). For this discussion, assume that a practical AID converter has a dynamic range of 6 dB per bit of resolution. Oversampling of the signal of interest can improve the effective dynamic range by spreading the quantization noise over the larger Nyquist bandwidth of the A/D. The effect is to increase the dynamic range by one bit for each quadrupling of the sample rate. On the other hand, some headroom must be allowed in the A/D sampling to control clipping to an acceptable level.

As a practical IBOC DAB example, assume an 8-bit AID with 48 dB instantaneous dynamic range in its Nyquist bandwidth. Further assume a headroom of 12 dB peak-to-average ratio in the AGC, and another 10 dB of margin for fading and AGC "slop". An oversampling ratio of 256 can increase the effective dynamic range in the signal bandwidth by 12 dB (in effect canceling the A/D headroom loss). Then the effective IF dynamic range in the IBOC signal bandwidth would be about 48 dB minus the 10 dB margin for fading, resulting in about 38 dB. If an instantaneous signal dynamic range of 28 dB in the signal bandwidth is required to detect the IBOC DAB signal without fading, then there is a margin of about 10 dB in the IF and A/D. This margin could be consumed by a large second adjacent signal entering the analog IF filter prior to A/D conversion.

It is a reasonable assumption that a good selective IF filter would suppress the second adjacent analog FM signal at 400 kHz away from FM center frequencies, but its IBOC sideband at 200 to 270 kHz from center would pass through the filter. If a second adjacent interferer is more than about +20 dB, then the dynamic range requirement of the A/D is increased by the excess second adjacent signal level above 20 dB. For example, if the second adjacent interferer is +50 dB, then the increased requirement above the minimum dynamic range is 30 dB, or about 5 more bits of A/D resolution above the minimum. However, there are ways to deal with the dynamic range issue other than the brute force method of increasing the bits in the A/D.

When a second adjacent interferer is +30 dB higher than the signal of interest, then the out-of-band emissions from it will likely corrupt the digital sideband on that side. Since corruption at that level will render that sideband useless, it may be preferable to filter out that sideband prior to A/D conversion. Filtering out the large second adjacent signal will restore the effective dynamic range eliminating the need for more bits of resolution. One way to approach this problem is to provide a set of selectable filters having different passbands for IF filtering prior to the A/D/converter.

Although the use of multiple filters may provide a good technical solution, the cost of the receiver is increased by the additional filters and switches. Also the accuracy of the filters may have an effect on cost.

There is a need for an improved method of minimizing the effects of first adjacent interference in IBOC DAB signals.

SUMMARY OF THE INVENTION

This invention provides a method of receiving an FM digital audio broadcasting signal including a first plurality of subcarriers in an upper sideband of a radio channel and a second plurality of subcarriers in a lower sideband of the radio channel. The method comprises the steps of mixing the digital audio broadcasting signal with a local oscillator signal to produce an intermediate frequency signal, passing the intermediate frequency signal through a bandpass filter to produce a filtered signal, determining if one of the upper and lower sidebands of the digital audio broadcasting signal is corrupted, and adjusting the local frequency oscillator signal to change the frequency of the intermediate frequency signal such that the bandpass filter removes the subcarriers in the upper or lower sideband that has been corrupted.

The invention also encompasses a receiver for receiving an FM digital audio broadcasting signal including a first plurality of subcarriers in an upper sideband of a radio channel and a second plurality of subcarriers in a lower sideband of the radio channel. The receiver includes a mixer for mixing the digital audio broadcasting signal with a local oscillator signal to produce an intermediate frequency signal, a filter for filtering the go intermediate frequency signal to produce a filtered signal, means for determining if one of the upper and lower sidebands of the digital audio broadcasting signal is corrupted, means for adjusting the local frequency oscillator signal to change the frequency of the intermediate frequency signal such that the bandpass filter removes the subcarriers in the upper or lower sideband that has been corrupted, and means for processing the filtered signal to produce an output signal.

DETAILED DESCRIPTION OF THE INVENTION

Figure 1:
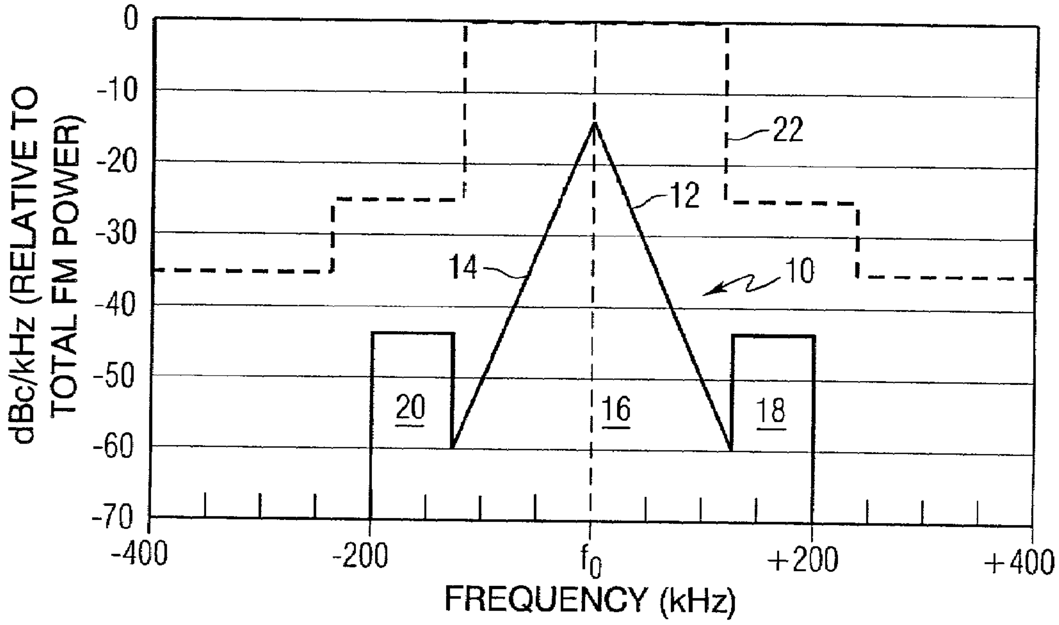
FIG. 1 is a schematic representation of a hybrid FM DAB spectrum.

Referring to the drawings, FIG. 1 is a schematic representation of the frequency allocations (spectral placement) and relative power spectral density of the signal components for a hybrid FM IBOC DAB signal 10. The hybrid format includes the conventional FM stereo analog signal 12 having a power spectral density represented by the triangular shape 14 positioned in a center, or central, frequency band 16 portion of the channel. The Power Spectral Density (PSD) of a typical analog FM broadcast signal is nearly triangular with a slope of about −0.35 dB/kHz from the center frequency. A plurality of digitally modulated evenly spaced subcarriers are positioned on either side of the analog FM signal, in an upper sideband 18 and a lower sideband 20, and are transmitted concurrently with the analog FM signal. All of the carriers are transmitted at a power level that falls within the United States Federal Communications Commission channel mask 22.

In one example of a hybrid FM IBOC modulation format, 95 evenly spaced orthogonal frequency division multiplexed (OFDM) digitally modulated subcarriers are placed on each side of the host analog FM signal occupying the spectrum from about 129 kHz through 198 kHz away from the host FM center frequency as illustrated by the upper sideband 18 and the lower sideband 20 in FIG. 1. In the hybrid system, the total DAB power in the OFDM digitally modulated subcarriers in each sideband is set to about −25 dB relative to its host analog FM power.

Figure 2:
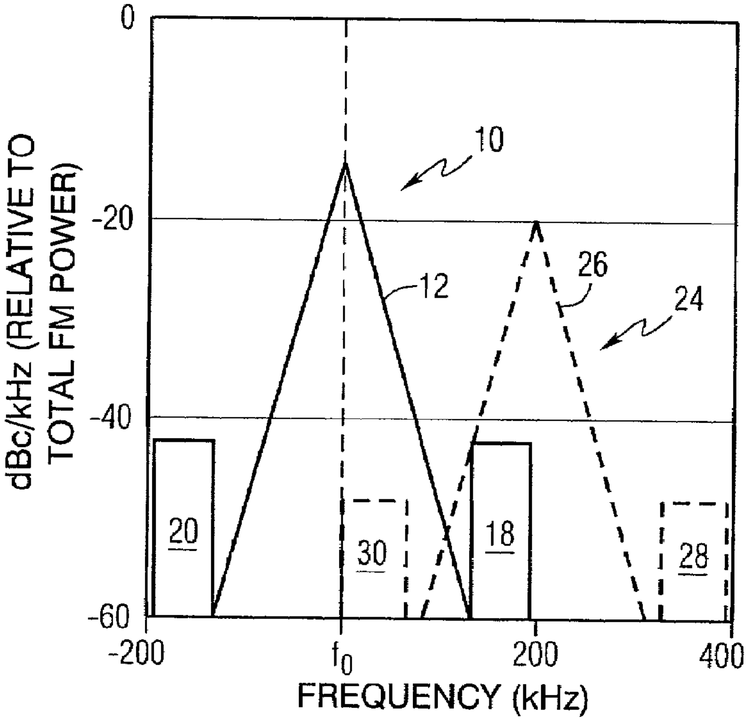
FIG. 2 is a schematic representation of an interference scenario showing a first adjacent signal at −6 dB relative to the signal of interest.

Signals from an adjacent FM channel (i.e. the first adjacent FM signals), if present, would be centered at a spacing of 200 kHz from the center of the channel of interest. FIG. 2 shows a spectral plot of a hybrid DAB signal 10 with an upper first adjacent interferer 24 centered 200 kHz above the center of signal 10, and having an analog modulated signal 26 and a plurality of digitally modulated subcarriers in sidebands 28 and 30, that are at a level of about −6 dB relative to the signal of interest (the digitally modulated subcarriers of signal 10). FIG. 2 shows that the DAB upper sideband 18 is corrupted by the analog modulated signal in the first adjacent interferer.

Figure 3:
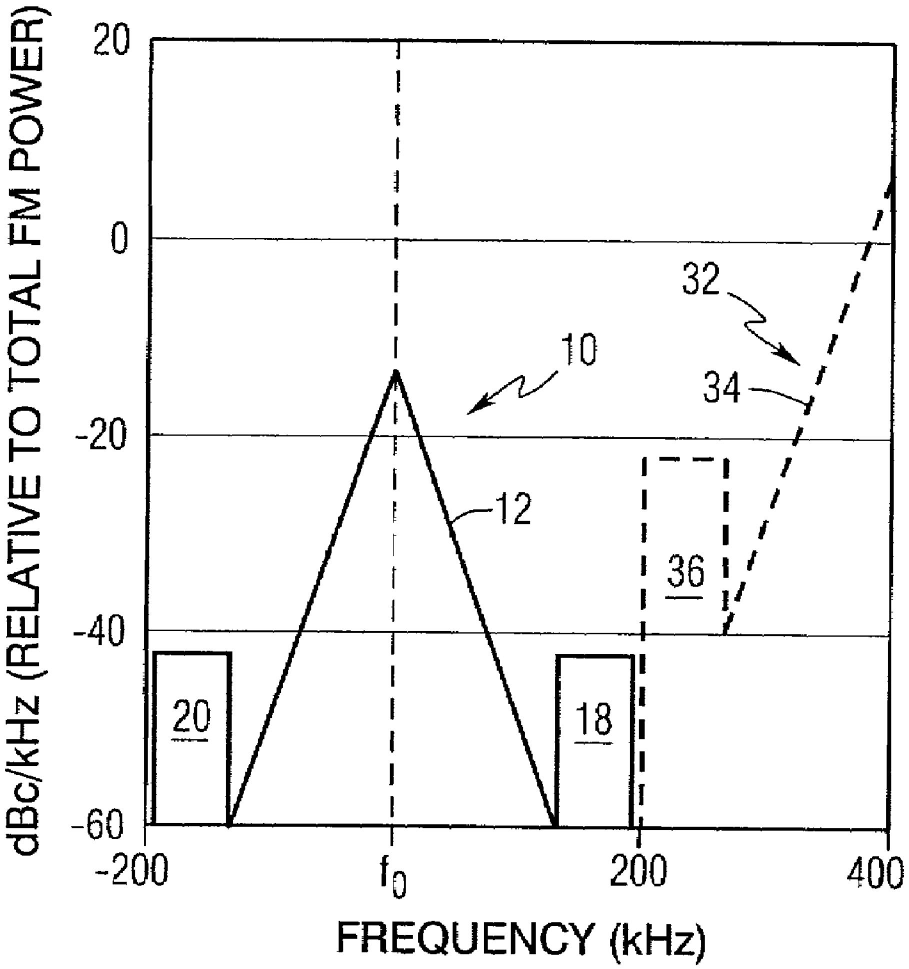
FIG. 3 is a schematic representation of an interference scenario with a second adjacent signal at +20 dB relative to the signal of interest.

FIG. 3 is a schematic representation of an interference scenario with a second adjacent signal 32 centered 400 kHz above the center of the signal of interest, and at +20 dB with respect to the signal of interest. The second adjacent signal includes an analog modulated signal 34 and a plurality of digitally modulated subcarriers in a lower sideband 36. The upper sideband of the second adjacent signal is not shown in this Figure.

Figure 4:
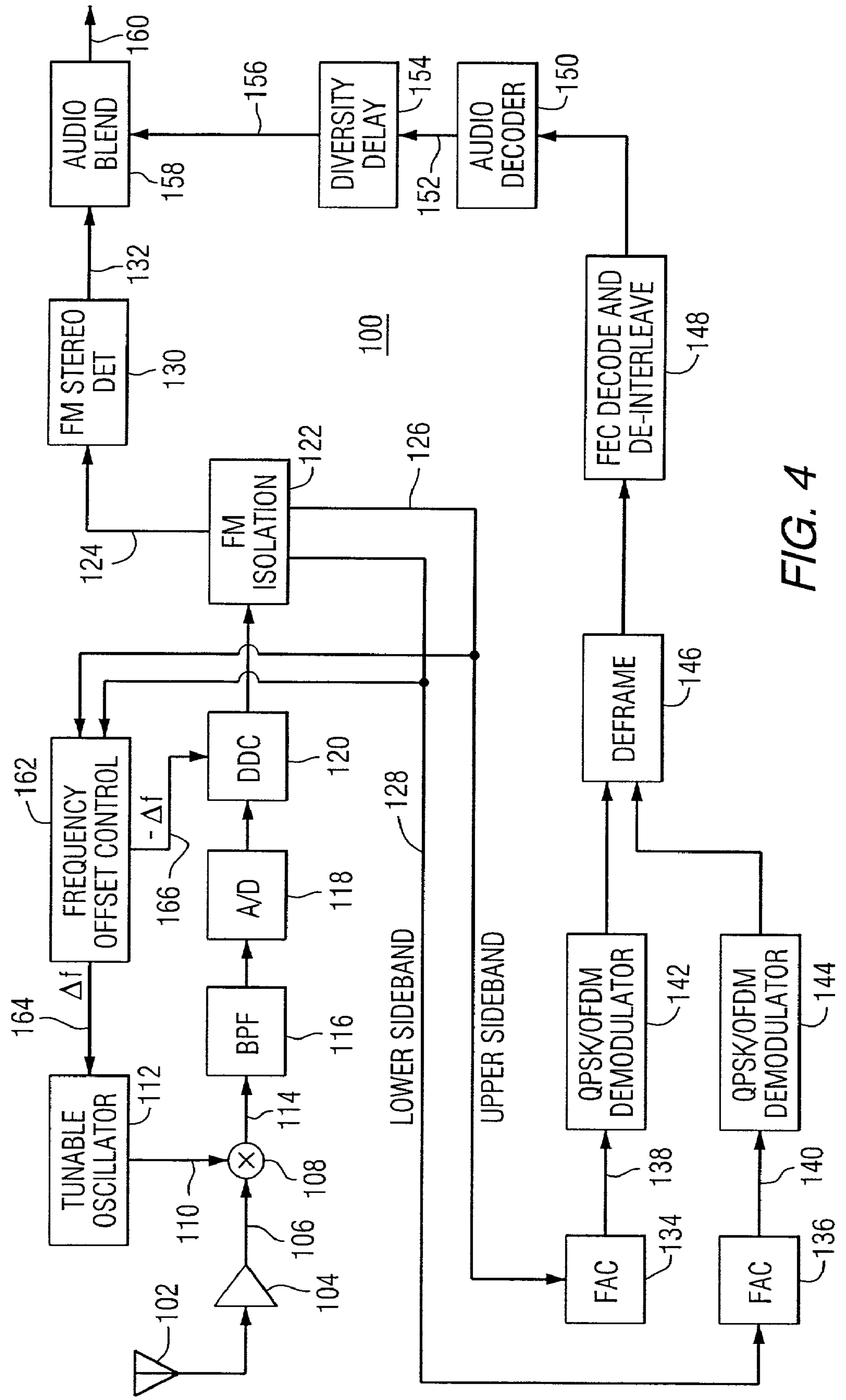
FIG. 4 is a functional block diagram of a receiver constructed in accordance with the invention.

FIG. 4 is a block diagram of a receiver 100 constructed in accordance with the invention. Antenna 102 serves as a means for receiving an in-band on-channel digital audio broadcast signal including a signal of interest in the form of an analog modulated FM carrier and a plurality of OFDM digitally modulated subcarriers located in upper and lower sidebands with respect to the analog modulated FM carrier. The receiver includes a front end circuit 104 that is constructed in accordance with well known techniques. The signal on line 106 from the front end is mixed in mixer 108 with a signal on line 110 from a local oscillator 112 to produce an intermediate frequency (IF) signal on line 114. The IF signal passes through a bandpass filter 116 and is then digitized by an analog-to-digital converter 118. A digital down converter 120 produces in-phase and quadrature baseband components of the composite signal. The composite signal is then separated by FM isolation filters 122 into an analog FM component on line 124 and upper and lower DAB sideband components on lines 126 and 128. The analog FM stereo signal is digitally demodulated and demultiplexed as illustrated in block 130 to produce a sampled stereo audio signal on line 132.

The upper and lower DAB sidebands are initially processed separately after the isolation filters. The baseband upper sideband DAB signal on line 126 and the baseband lower sideband DAB signal on line 128 are separately processed by a first adjacent canceller as illustrated by blocks 134 and 136, to reduce the effect of first adjacent interference. The resulting signals on lines 138 and 140 are demodulated as illustrated in blocks 142 and 144.

After demodulation, the upper and lower sidebands are combined for subsequent processing and deframed in deframer 146. Next the DAB signal is FEC decoded and de-interleaved as illustrated by block 148. An audio decoder 150 recovers the audio signal. The audio signal on line 152 is then delayed as shown in block 154 so that the DAB stereo signal on line 156 is synchronized with the sampled analog FM stereo signal on line 132. Then the DAB stereo signal and the sampled analog FM stereo signal are blended as shown in block 158, to produce a blended audio signal on line 160.

To remove adjacent channel interference, receivers constructed in accordance with this invention include a frequency offset control 162. The frequency offset control estimates the relative powers in the upper and lower DAB sidebands, and then makes a decision as to whether to invoke a frequency offset in the tunable local oscillator. The offset, if any, is applied to the tunable local oscillator as shown by line 164 and the negative of this offset is applied to the digital down converter as shown by line 166.

Figure 5:
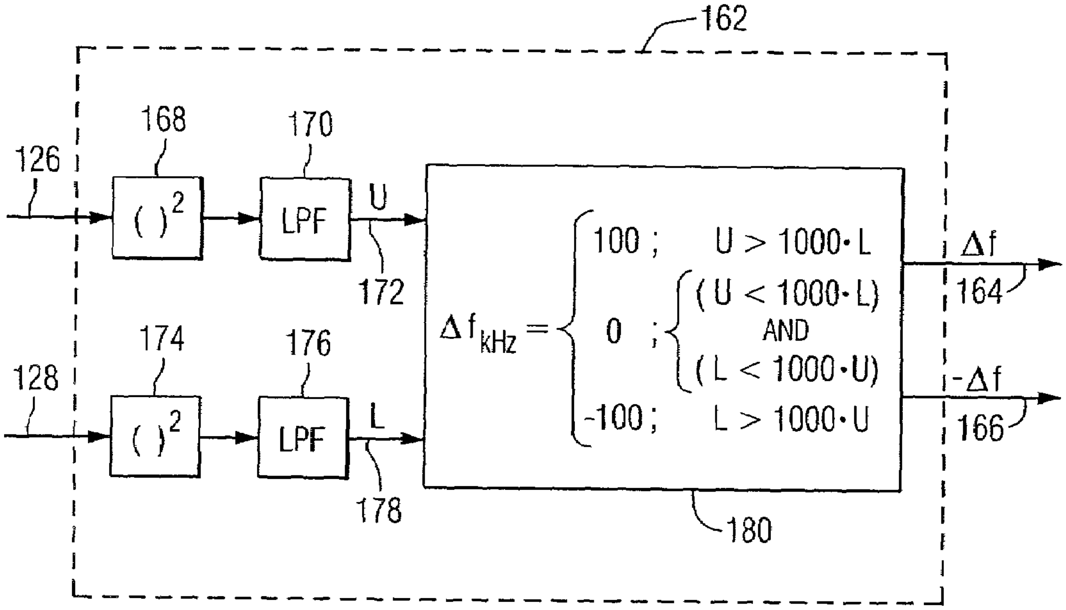
FIG. 5 is a functional block diagram of the frequency offset control of the receiver of FIG. 4.

FIG. 5 shows an example of the implementation of the frequency offset control 162. The input signals on lines 126 and 128 are the upper and lower DAB sidebands out of the isolation filters 122.

The frequency offset control uses a squaring and lowpass filtering (LPF) technique to measure the relative powers of the inputs. The upper DAB sideband signal on line 126 is squared as illustrated in block 168 and low pass filtered as illustrated in block 170 to produce a filtered upper sideband signal U on line 172. The lower DAB sideband signal on line 128 is squared as illustrated in block 174 and low pass filtered as illustrated in block 176 to produce a filtered upper sideband signal L on line 178. The low pass filters could be simple lossy integrators with a time constant on the order of one second.

The frequency offset $\Delta f$ is then determined by comparing the filtered upper and lower sideband signal power as illustrated in block 180. For example, if the filtered upper sideband signal power is greater than 1000 times the filtered lower sideband signal power, the frequency offset is set to 100 kHz. If the filtered lower sideband signal power is greater than 1000 times the filtered upper sideband signal power, the frequency offset is set to −100 kHz. If the filtered upper sideband signal power is less than 1000 times the filtered lower sideband signal power, and the filtered lower sideband signal power is less than 1000 times the filtered upper sideband signal power, then frequency offset is set to zero. The method for establishing the value of $\Delta f$ involves thresholds and hysteresis as shown in the example of FIG. 5. The hysteresis used in setting thresholds prevents frequent changes in the adjustments of $\Delta f$.

One implementation of the invention applies a frequency offset to the local oscillator, thereby changing the intermediate frequency signal such that the skirt of the IF filter 116 suppresses the second adjacent on the appropriate sideband. Although this effectively places the second adjacent interferer in the stop band of the IF filter, the resulting frequency offset for subsequent signal processing may be undesirable. The frequency offset can be removed by offsetting the detuning in the digital frequency tracking after the down conversion process by the same (negative) frequency offset. A digital numerically controlled oscillator is already present in the previous receiver designs, so no additional hardware cost would be incurred in the receiver. Although the offset IF tuning allows a wider bandwidth on the "good" sideband, it is unlikely this will result in a dynamic range problem. This is because the likelihood of very strong second adjacent signals on both sides of the signal of interest simultaneously is very small. The IBOC DAB receiver would detect the presence of a large second adjacent interferer, and then provide the appropriate IF filtering.

The presence of a large interferer can be detected by measuring the level of the desired signal. If the level is significantly below the level expected to be set by the automatic gain control, then a large interferer is likely. It is very unlikely that the large interferer is a first adjacent signal due to intentional geographic protection. A very large first adjacent signal (−20 dB D/U or worse) would be unrecoverable anyway. Third adjacent interferers would be out of the filter passband. So the large interferer is assumed to be a second adjacent. A detection algorithm can detect the presence of a large power of the second adjacent's digital sideband. This detection algorithm would also determine whether the large interferer is an upper or lower second adjacent signal. A frequency offset control signal is created after appropriate filtering and possibly hysteresis on the relative interference power to prevent false detection. This control signal instructs the local oscillator 112 to detune by 100 kHz in the appropriate direction while the digital local oscillator in block 120 is offset by 100 kHz in the opposite direction such that the resulting digital signal output from the digital down converter still appears at baseband.

While the present invention has been described in terms of what is believed at present to be the preferred embodiments thereof, it will be appreciated by those skilled in the art that various modifications to the disclosed embodiments may be made without departing from the scope of the invention as set forth in the appended claims.

What is claimed is:

1. A method of receiving an FM digital audio broadcasting signal including a first plurality of subcarriers in an upper sideband of a radio channel and a second plurality of subcarriers in a lower sideband of the radio channel, the method comprising the steps of:
- mixing the digital audio broadcasting signal with a local oscillator signal to produce an intermediate frequency signal;
- passing the intermediate frequency signal through a bandpass filter to produce a filtered signal;
- determining if one of the upper and lower sidebands of the digital audio broadcasting signal is corrupted by an interfering signal; and
- applying a frequency offset to the local frequency oscillator signal to change the frequency of the intermediate frequency signal such that the bandpass filter removes the interfering signal.

2. The method of claim 1, wherein the step of determining if one of the upper and lower sidebands of the digital audio broadcasting signal is corrupted comprises the steps of:
- converting the filtered signal to a digital signal;
- converting the digital signal to upper and lower baseband signals;
- comparing the upper and lower baseband signals; and
- selecting a frequency offset based on the comparison.

3. The method of claim 2, wherein the step of comparing the upper and lower baseband signals comprises the steps of:
- squaring each of the upper and lower baseband signals to produce a squared upper sideband signal and a squared lower sideband signal;
- filtering the squared upper sideband signal to produce a filtered upper sideband signal;
- filtering the squared lower sideband signal to produce a filtered lower sideband signal; and
- comparing the filtered upper sideband signal and filtered lower sideband signal.

4. The method of claim 3, wherein the step of comparing the filtered upper sideband signal and filtered lower sideband signal comprises the steps of:
- determining if the power of the upper sideband signal exceeds the power of the lower sideband signal by a first predetermined factor; and determining if the power of the lower sideband signal exceeds the power of the upper sideband signal by a second predetermined factor.

5. The method of claim 4, wherein each of the first and second predetermined factors is 1000.

6. The method of claim 1, further comprising the steps of:

digitizing the filtered signal to produce a digital filtered signal;

converting the digital filtered signal to a baseband signal; and removing the frequency offset from the baseband signal.

7. The method of claim 6, wherein the step of removing the frequency offset from the baseband signal comprises the step of:

applying a negative frequency offset to a digital down converter.

8. The method of claim 1, wherein the FM digital audio broadcasting signal occupies a bandwidth of about 400 kHz;

the upper sideband lies between about +100 kHz and about +200 kHz of the center of the channel; and the lower sideband lies between about −100 kHz and about −200 kHz of the center of the channel.

9. A receiver for receiving an FM digital audio broadcasting signal including a first plurality of subcarriers in an upper sideband of a radio channel and a second plurality of subcarriers in a lower sideband of a radio channel, the receiver comprising:

a mixer for mixing the digital audio broadcasting signal with a local oscillator signal to produce an intermediate frequency signal;

a bandpass filter for filtering the intermediate frequency signal to produce a filtered signal;

means for determining if one of the upper and lower sidebands of the digital audio broadcasting signal is corrupted by an interfering signal, and for controlling the local frequency oscillator signal to change the frequency of the intermediate frequency signal such that the bandpass filter removes the interfering signal; and means for processing the filtered signal to produce an output signal.

10. The receiver of claim 9, wherein the means for determining if one of the upper and lower sidebands of the digital audio broadcasting signal is corrupted comprises:

an analog to digital converter for converting the filtered signal to a digital signal;

a down converter for converting the digital signal to upper and lower baseband signals; and means for comparing the magnitudes of the upper and lower baseband signals.

11. The receiver of claim 10, wherein the means for comparing the magnitudes of the upper and lower baseband signals comprises:

means for squaring and filtering each of the upper and lower baseband signal to produce a filtered upper baseband signal and a filtered lower baseband signal; and means for producing a first frequency offset signal when the magnitude of the filtered upper baseband signal exceeds the magnitude of the filtered lower baseband signal by a first predetermined factor or producing a second frequency offset signal when the magnitude of the filtered lower baseband signal exceeds the magnitude of the filtered upper baseband signal by a second predetermined factor.

12. The receiver of claim 10, further comprising:

means for applying a negative of one of the first and second frequency offset signals to the down converter.

13. A receiver for receiving an FM digital audio broadcasting signal including a first plurality of subcarriers in an upper sideband of a radio channel and a second plurality of subcarriers in a lower sideband of a radio channel, the receiver comprising:

a mixer for mixing the digital audio broadcasting signal with a local oscillator signal to produce an intermediate frequency signal;

a bandpass filter for filtering the intermediate frequency signal to produce a filtered signal;

a frequency offset control for determining if one of the upper and lower sidebands of the digital audio broadcasting signal is corrupted by an interfering signal, and for controlling the local frequency oscillator signal to change the frequency of the intermediate frequency signal such that the bandpass filter removes the interfering signal; and a circuit for processing the filtered signal to produce an output signal.

14. The receiver of claim 13, further comprising:

an analog to digital converter for converting the filtered signal to a digital signal;

a down converter for converting the digital signal to upper and lower baseband signals; and a comparator for comparing the magnitudes of the upper and lower baseband signals.

15. The receiver of claim 14, wherein the frequency offset control comprises:

squaring and filtering circuits for squaring and filtering each of the upper and lower baseband signal to produce a filtered upper baseband signal and a filtered lower baseband signal; and an offset circuit for producing a first frequency offset signal when the magnitude of the filtered upper baseband signal exceeds the magnitude of the filtered lower baseband signal by a first predetermined factor or producing a second frequency offset signal when the magnitude of the filtered lower baseband signal exceeds the magnitude of the filtered upper baseband signal by a second predetermined factor.

16. The receiver of claim 14, wherein the frequency offset control applies a negative of one of the first and second frequency offset signals to the down converter.

17. The method of claim 1, where the FM digital audio broadcasting signal includes coded digital information in both the upper and lower sidebands, such that the digital information can be retrieved from either sideband.

18. The receiver of claim 9, where the FM digital audio broadcasting signal includes coded digital information in both the upper and lower sidebands, such that the digital information can be retrieved from either sideband.

19. The receiver of claim 13, where the FM digital audio broadcasting signal includes coded digital information in both the upper and lower sidebands, such that the digital information can be retrieved from either sideband.

* * * * *

UNITED STATES PATENT AND TRADEMARK OFFICE

CERTIFICATE OF CORRECTION

PATENT NO. : 7,221,917 B2
APPLICATION NO. : 10/136136
DATED : May 22, 2007
INVENTOR(S) : Brian William Kroeger It is certified that error appears in the above-identified patent and that said Letters Patent is hereby corrected as shown below:

Cover Page
(73) Assignee
"IBiquity Digital Corporation" should read --iBiquity Digital Corporation--

Background of the Invention
Column 2, Line 13
"AID converter" should read --A/D converter--

Column 2, Line 21
"8-bit AID" should read --8-bit A/D--

Summary of the Invention
Column 3, Line 24
After "filtering the" delete "go"

Signed and Sealed this

Twenty-seventh Day of November, 2007

JON W. DUDAS
*Director of the United States Patent and Trademark Office*